Oct. 16, 1934. J. N. GOOD 1,976,846
ELECTROPNEUMATIC BRAKE
Filed March 14, 1929 2 Sheets-Sheet 2

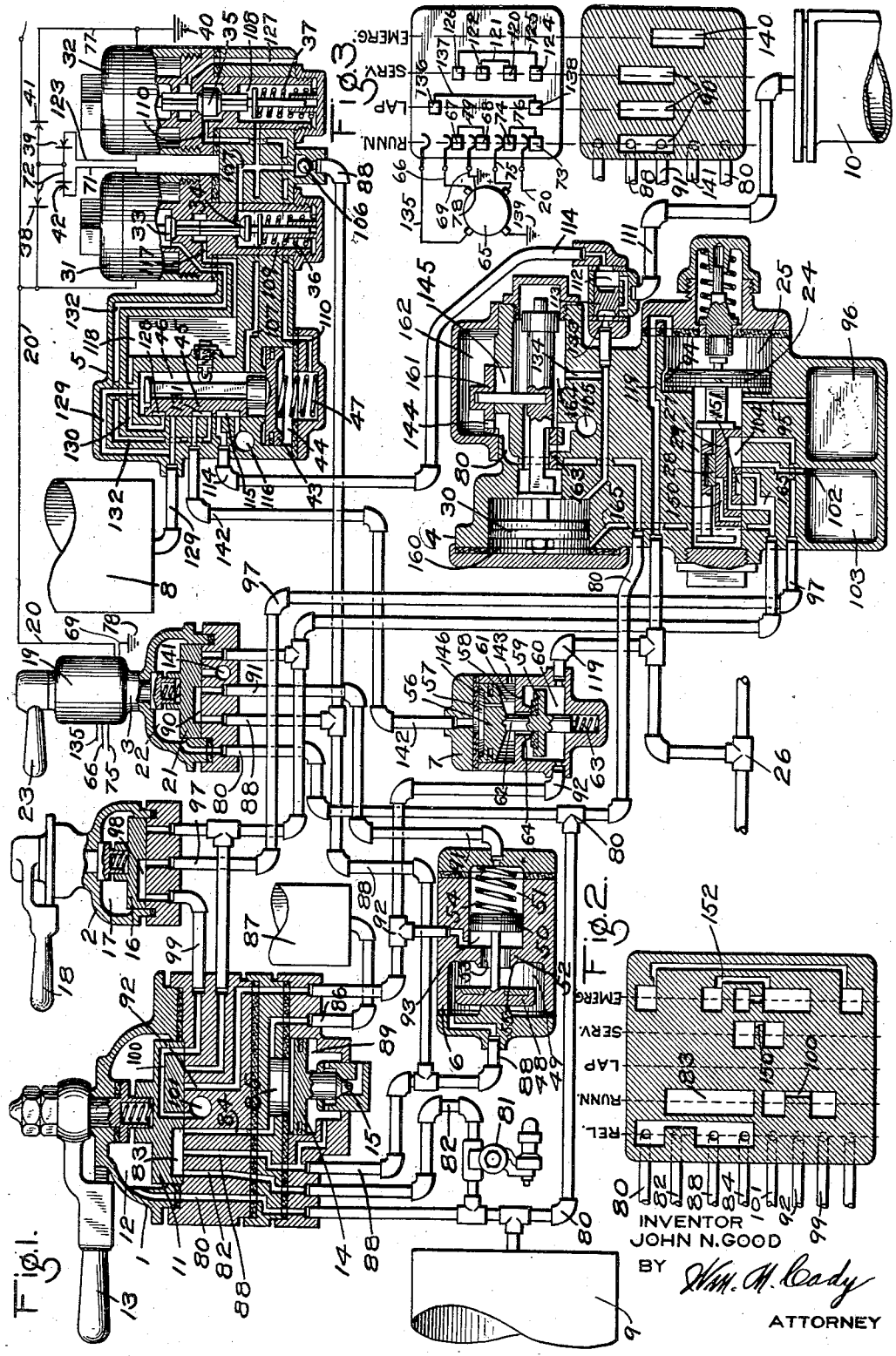

INVENTOR
JOHN N. GOOD
BY Wm. M. Cady
ATTORNEY

Patented Oct. 16, 1934

1,976,846

UNITED STATES PATENT OFFICE 1,976,846

ELECTROPNEUMATIC BRAKE

John N. Good, Wilmerding, Pa., assignor to The Westinghouse Air Brake Company, Wilmerding, Pa., a corporation of Pennsylvania Application March 14, 1929, Serial No. 347,033

18 Claims. (Cl. 303—15)

This invention relates to electro-pneumatic brakes and more particularly to a locomotive brake equipment.

It has heretofore been proposed to provide an electropneumatic brake equipment for railway cars in which two magnet devices are employed for controlling the brakes electrically, the magnet devices being controlled by the flow of electric current through a single train wire. Such an equipment has been disclosed in the pending application of Thomas H. Thomas and John N. Good, Serial No. 341,603, filed February 21, 1929.

The principal object of my invention is to provide an electro-pneumatic brake equipment for locomotives, for controlling the operation of car brakes of the above mentioned type.

Figure 4:
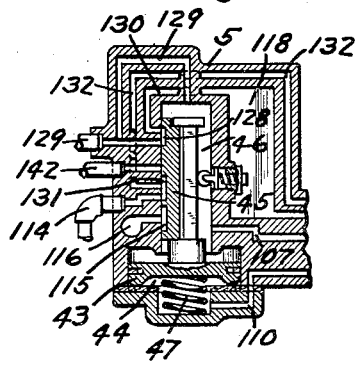
Figure 5:
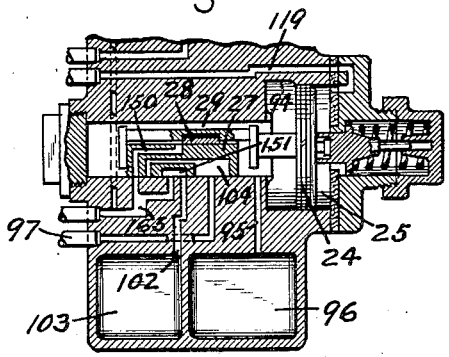
Figure 8:
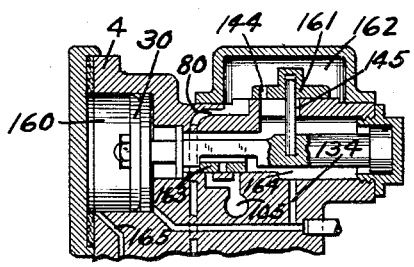
Figure 6:
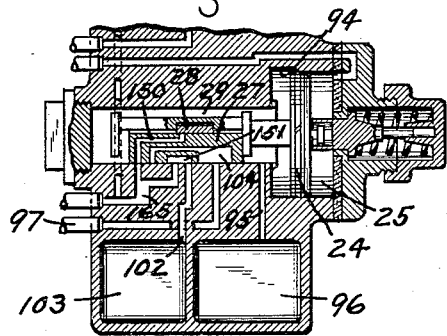
Figure 9:
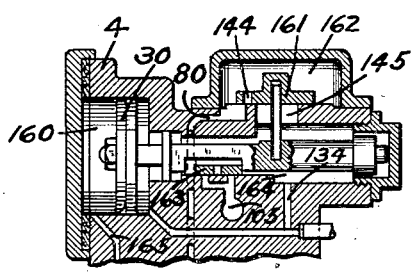
Figure 7:
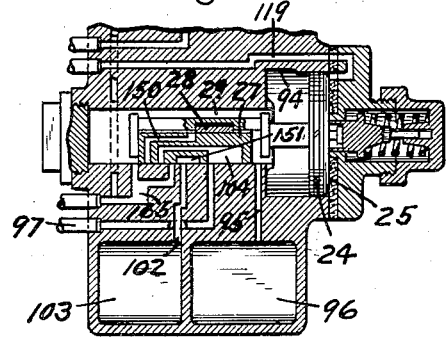

In the accompanying drawings, Figure 1 is a diagrammatic view, partly in section, of an electro-pneumatic locomotive brake equipment embodying my invention; Fig. 2 is a diagrammatic development of an automatic brake valve device of the construction shown in Fig. 1; Fig. 3 is a diagrammatic development of a combined brake switch and valve device of the construction shown in Fig. 1; Fig. 4 is a diagrammatic view, showing the slide valve of the electrically controlled application valve device in service position; Fig. 5 is a diagrammatic view of the equalizing portion of the distributing valve device showing the slide valves in service position; Fig. 6 is a diagrammatic view of the equalizing portion of the distributing valve device showing the slide valves in lap position; Fig. 7 is a diagrammatic view of the equalizing portion of the distributing valve device showing the slide valves in emergency position; Fig. 8 is a diagrammatic view of the application portion of the distributing valve device showing the slide valves in application position; and Fig. 9 is a diagrammatic view of the application portion of the distributing valve device showing the slide valves in lap position.

As shown in the drawings, the electro-pneumatic brake equipment comprises an automatic brake valve device 1, an independent brake valve device 2, a brake switch device 3, a distributing valve device 4, an electrically controlled application valve device 5, a cut-off valve device 6, a vent valve device 7, an auxiliary reservoir 8, a main reservoir 9 and a brake cylinder 10.

The automatic brake valve device 1 is of the usual well known type and comprises a rotary valve 11, contained in a chamber 12 and adapted to be operated by a handle 13, an equalizing piston 14, and an exhaust valve 15 adapted to be operated by said piston.

The independent brake valve device 2 is of the usual type employed in the well known "E T" locomotive brake equipment by which the locomotive brakes may be controlled independently of the train brakes and comprises a rotary valve 16 contained in a chamber 17 and adapted to be operated by a handle 18.

The brake switch device 3 comprises a casing 19 containing a drum (not shown) carrying a plurality of electrical contacts for controlling current flow through a train wire 20. A development of the drum with the electrical contacts is shown in Fig. 3 and the current supply may be from any suitable source such as an A. C.-D. C. generator 65, such a brake switch device being more fully described in the aforementioned pending application. The brake switch device also comprises a rotary valve 21 contained in a chamber 22, the contact drum and rotary valve 21 being adapted to be operated by a handle 23.

The distributing valve device 4 comprises the usual equalizing portion and application portion. The equalizing portion comprises a piston 24 contained in a chamber 25, which is connected through passage 119 to a brake pipe 26, and a main slide valve 27 and auxiliary slide valve 28 contained in a valve chamber 29 and adapted to be operated by said piston.

The application portion of the distributing valve device 4 comprises a piston 30 contained in a chamber 160, an application slide valve 161 contained in a chamber 162 and an exhaust slide valve 163 contained in a chamber 164, said slide valves being adapted to be operated by the piston 30.

The electrically controlled application valve device 5 comprises a magnet portion and a valve portion. The magnet portion comprises a magnet 31 and a magnet 32, valves 33 and 34 operable by the magnet 31 and a double beat valve 35 operable by the magnet 32. A spring 36 acting on valve 34 is adapted to seat said valve and unseat the valve 33 when the magnet 31 is deenergized, while a spring 37 is employed to urge the double beat valve 35 to its upper seat, when magnet 32 is deenergized.

The coils (not shown) of the magnets 31 and 32 are connected in parallel to the train wire 20 and interposed in the train wire connections are rectifiers 38 and 39 to prevent current flow to magnet 32 when the current is flowing from the train wire 20 to a ground 40. Rectifiers 41 and 42 are provided to prevent current flow through magnet 31 when the current is flowing in a direction from the ground 40 to the train wire 20.

The valve portion of the electrically controlled application valve device 5 comprises a piston 43 contained in a chamber 44 and a slide valve 45 contained in a chamber 46 and adapted to be operated by said piston. A spring 47 is provided in chamber 44 to urge the piston 43 and slide valve 45 to the position shown in the drawings.

The cut-off valve device 6 comprises a valve 48 contained in a chamber 49 and a piston 50 having at one side a chamber 51 and at the opposite side a chamber 93. The chambers 49 and 93 are separated by a wall 52 having an opening 53 through which a stem extends to operatively connect the valve 48 with the piston 50. A spring 54 is employed at the right side of piston 50 for shifting the valve 48 away from a seat rib 55, surrounding the opening 53, under certain conditions which will be hereinafter described.

The vent valve device 7 comprises a piston 56 having a chamber 57 at its upper side and a chamber 58 at its lower side, and a valve 59 contained in a chamber 60. The chambers 58 and 60 are separated by an apertured wall 61. Through the aperture in said wall a stem 62 extends for operatively connecting the valve 59 with the piston 56. A spring 63 is employed for urging the valve 59 against a seat rib 64.

In operation, when the brakes are released and the brake equipment is to be charged, the brake switch device 3 and the brake valve devices 1 and 2 are placed in running position, as shown in the drawings.

When the brake switch device 3 is in running position, D. C. current flows from the positive terminal of the generator 65 through wire 75, contact 74, wire 76, and contact 73 to the train wire 20 and from thence through the coil in magnet 31, wire 71, rectifier 42, wire 72, rectifier 41 and wire 77 to ground 40, then to ground 78 at the brake switch and through wire 69, contact 68, wire 79, contact 67 and wire 66 to the negative terminal of the generator. The magnet 31 is thereby energized, which operates to seat valve 33 and unseat valve 34 against the pressure of spring 36. Since the direction of the D. C. current flow, as above described is from the train wire 20 to ground 40, the rectifiers 38 and 39 prevent flow through the magnet 32, which thus is deenergized and spring 37 holds the double beat valve 35 seated in the position shown in the drawings.

Fluid under pressure from the main reservoir 9 flows through pipes and passages 80 to the rotary valve chamber 12 of the brake valve device 1, rotary valve chamber 22 of the brake switch device 3, to the application slide valve chamber 162 of the distributing valve device 4 and to a feed valve device 81, which feed valve device reduces the pressure of fluid from the main reservoir to that normally carried in the brake pipe. Fluid at this reduced pressure then flows from the feed valve device 81 through pipe and passage 82 to the seat of the rotary valve 11 in the automatic brake valve device.

With the rotary valve 11 of the automatic brake valve device in running position, as shown in the drawings, fluid at the reduced pressure supplied from the feed valve device 81 flows from passage 82, through cavity 83 in the rotary valve and passage 84 to chamber 85 at the upper side of the equalizing piston 14 and from thence through passage and pipe 86 to an equalizing reservoir 87. Fluid at the reduced pressure supplied by the feed valve device 81 also flows from cavity 83 in the rotary valve 11 through passage 88 to chamber 89 at the lower side of the equalizing piston 14. The fluid pressures thus become balanced on the opposite sides of the equalizing piston 14 and said piston operates to seat the discharge valve 15 in the position shown in the drawings.

Fluid at the reduced pressure supplied to passage 88 flows therefrom to the chamber 49 containing valve 48 in the cut-off valve device 6 and also through cavity 90 in rotary valve 21 of the brake switch device 3 and passage and pipe 91 to chamber 51 at the right side of the cut-off valve piston 50. With the fluid pressures thus equal in chambers 49 and 51, the spring 54 maintains the valve 48 away from the seat ring 55, so that fluid under pressure from chamber 49 is permitted to flow through the opening 53 in the casing wall 52, chamber 93 at the left side of the cut-off valve piston 50 and passage and pipe 92 to the seat of the rotary valve 11 of the brake valve device 1 and also to chamber 60 in the vent valve device 7 and from thence through passage and pipe 119 to the usual brake pipe 26, and to the equalizing piston chamber 25 of the distributing valve device 4.

Fluid under pressure supplied to the equalizing piston chamber 25 causes the equalizing piston 24 to shift the slide valves 27 and 28 to their release position, as shown in Fig. 1 of the drawings, in which position a feed groove 94 is uncovered, thereby permitting fluid under pressure to flow from the piston chamber 25 to the valve chamber 29 and from thence through passage 95 to a pressure chamber 96.

With the equalizing slide valve 27 of the distributing valve device in release position, the application piston chamber 160 is connected to the atmosphere through passage 165, pipe and passage 97, cavity 104 in the equalizing slide valve 27, cavity 98 in the rotary valve 16 of the independent brake valve device 2, passage and pipe 99, cavity 100 in rotary valve 11 of the automatic brake valve device 1 and an atmospheric passage 101. The application chamber 103 is also connected to passage 165 through passage 102 and cavity 104 in the slide valve 27 and is therefore normally at atmospheric pressure.

When the application piston chamber 160 is at atmospheric pressure, the application piston 30 and slide valves 161 and 163 assume the position shown in Fig. 1 of the drawings, in which the valve chamber 164 is connected to the atmosphere through passage 105.

Fluid at the pressure supplied to pipe 88 also flows past the check valve 106 in the application valve device 5 and through passage 107 to chamber 108 containing valve spring 37, chamber 109 containing valve 34 and to valve chamber 46, and from said valve chamber through passage 129 to the auxiliary reservoir 8, thereby charging said reservoir.

With the magnet 32 normally deenergized, as hereinbefore described, spring 37 seats valve 35 in the upper position, as shown in the drawings, in which position fluid under pressure from chamber 108 flows past the valve 35 and through passage 110 to piston chamber 44. The fluid pressures thus equalize on the opposite sides of the piston 43 and the spring 47 urges said piston and slide valve 45 to the position shown in Fig. 1 of the drawings, in which position the brake cylinder 10 is connected with the atmosphere through pipe and passage 111, a chamber 112 at the left side of a check valve 113, when said check valve is in the position shown in the drawings, passage and pipe 114, cavity 115 in the slide valve 45 and an atmospheric passage 116.

With the magnet 31 normally energized, as hereinbefore described, the valve 33 is seated and the valve 34 is unseated, which permits fluid under pressure to flow from valve chamber 109, past valve 34 and through passage 117 to an emergency chamber 118, thereby permitting said chamber to become charged with fluid at brake pipe pressure.

If it is desired to effect a service application of the brakes electrically, the handle 23 of the brake switch device 3 is operated to turn the contact drum (not shown) in the casing 19 and the rotary valve 21 to service position, in which position, shown in Fig. 3, the positive terminal of generator 65 is connected to contact 120, so that D. C. current flows through said contact, wire 121, contact 122 and wire 69 to ground 78 and from thence to ground 40 on the magnets, then through wire 77, magnet 32, wire 123, rectifier 39, wire 72, rectifier 38 and wire 20 to contact 124 in the brake switch device, thence through wire 125, contact 126 and wire 66 to the negative terminal of the generator 65. The magnet 32 is thereby energized and operates to seat the double beat valve 35 in its lower position, in which position fluid under pressure is vented from the piston chamber 44 through passage 110, past valve 35 and through an atmospheric passage 127. The pressure of fluid in the valve chamber 46 then shifts the piston 43 and slide valve 45 downwardly to service position against the pressure of spring 47.

In service position of the slide valve 45, a cavity 128 connects passage 129 from the auxiliary reservoir 8 to a passage 130 connected with the emergency chamber 118, and a cavity 131 connects the brake cylinder passage 114 with a passage 132 leading to the upper side of magnet valve 33.

With the brake switch device in service position, the direction of current flow is such as to energize magnet 32 on account of flowing from the ground 40 to said magnet. Consequently, the rectifier 42 prevents flow through the magnet 31, which as a result is deenergized. The spring 36 is thus permitted to seat valve 34 and unseat valve 33, which permits fluid under pressure, supplied from the auxiliary reservoir 8 through the emergency chamber 118 and passage 117, to flow past unseated valve 33, through passage 132, cavity 131 in slide valve 45 and passage and pipe 114 to chamber 112 at one side of the double check valve 113. Chamber 133 at the opposite side of said check valve is normally subject to atmospheric pressure due to the connection through pipe and passage 134, valve chamber 164 and the atmospheric passage 105, so that the pressure of fluid in chamber 112 shifts the check valve 113 to the left, permitting fluid under pressure to flow from pipe 114 through chamber 112 and passage and pipe 111 to the brake cylinder 10, thereby applying the brakes.

When effecting a service application of the brakes electrically by the operation of the brake switch device 3, in the manner hereinbefore described, the brake valve devices 1 and 2 are not operated, but remain in running position and in service position of the brake switch device 3, communication is maintained between passages 88 and 91 by way of cavity 90 in the rotary valve 21, so that fluid under pressure is supplied from the feed valve device 81 to the brake pipe 26 in the same manner as when the brakes are released. Also, since the auxiliary reservoir 8 is in constant communication with pipe 88 by way of passage 129, valve chamber 46, passage 107 and check valve 106, the pressure in said auxiliary reservoir is maintained during an electric service application of the brakes.

If it is desired to limit the degree of brake application when the brakes are applied in service the brake switch device 3 is operated from service to lap position, when the desired brake cylinder pressure is obtained. In lap position of the brake switch device, the A. C. portion of the generator 65 is connected to the train wire 20 by way of wire 135, contact 136 on the switch drum, wire 137 and contact 138. The A. C. portion of the generator is also connected to a ground 139. Since rectifiers are ineffective upon A. C. current, the A. C. circuit is thus closed through both of the magnets 31 and 32 and their common ground 40. The magnet 32 is thus retained energized, as when effecting a service application of the brakes. The magnet 31 is also energized, and operates to seat valve 33 and thereby prevent further flow of fluid under pressure from the auxiliary reservoir 8 and emergency chamber 118 to the brake cylinder 10, by way of passage 117, past valve 33 and through passage 132. It will thus be evident, that the brakes can be graduated on in steps as desired, by alternately moving the brake switch handle 23 to service and lap positions.

In order to release the brakes after an electric service application, the brake switch device is turned back to running position, in which the magnet 31 is energized and the magnet 32 is deenergized in the same manner as when initially charging the equipment. The deenergization of magnet 32 operates valve 35 to supply fluid under pressure to piston chamber 44 so as to permit spring 47 to shift the piston 43 and slide valve 45 to the position shown in Fig. 1 of the drawings, in which position fluid under pressure is vented from the brake cylinder 10 through pipe 111, chamber 112 in the double check valve device, pipe and passage 114, cavity 115 in the slide valve 45 and the atmospheric passage 116, thereby releasing the brakes. The energization of magnet 31 seats valve 33 and unseats valve 34, which permits fluid under pressure to flow from chamber 109 through passage 117 to the emergency chamber 118, in order to maintain said chamber charged.

If it is desired to effect an emergency application of the brakes, the brake switch handle 23 is operated to turn the rotary valve 21 and contact drum (not shown) to emergency position, in which passage and pipe 91 from the piston chamber 51 of the cut-off valve device 6 is connected to the atmosphere through cavity 140, as shown in Fig. 3, and an atmospheric passage 141. The fluid under pressure is thus vented from the piston chamber 51, and the pressure of fluid in chamber 93 at the opposite side of piston 50 then shifts said piston to the right against the pressure of spring 54 and thereby seats the valve 48 against the seat ring 55, so as to prevent further flow of fluid under pressure from the pipe 88 to the pipe 92 leading to the brake pipe 26.

In emergency position of the brake switch device 3, no electrical contacts are made. Consequently, both magnets 31 and 32 are deenergized. With magnet 32 deenergized, the valve 35 is seated in its upper position by spring 37 and fluid under pressure is supplied from the spring chamber 108 to the piston chamber 44 in order to permit spring 47 to maintain piston 43 and slide valve 45 in the position shown in the drawings as more fully described hereinbefore. With the magnet 31 deenergized, valve 34 is seated and valve 33 is unseated by the spring 36. Unseating of valve 33 permits the fluid under pressure from the emergency chamber 118 to flow through passage 117, past said valve, through passage 132, cavity 131 in the slide valve 45 and a passage and pipe 142 to chamber 57 at the upper side of the vent valve piston 56. The vent valve piston is thereby shifted downwardly, unseating the vent valve 59 and permitting a sudden venting of fluid under pressure from the brake pipe 26 through passage and pipe 119 and an atmospheric passage 143.

This sudden venting of fluid under pressure from the brake pipe permits a sudden reduction in pressure to occur in the connected equalizing piston chamber 25 of the distributing valve device 4. The pressure of fluid in the valve chamber 29 then shifts the piston 24 and slide valves 28 and 27 to emergency position, in which fluid under pressure is permitted to flow from the pressure chamber 96 through passage 95, valve chamber 29, past the right hand end of the slide valve 27 and through passage 165 to the application piston chamber 160.

Fluid under pressure supplied to the application piston chamber 30 shifts the piston 30 and slide valves 163 and 161 to the right, the initial movement causing slide valve 163 to lap the atmospheric passage 105 and further movement causing port 144 in slide valve 161 to register with opening 145 in the seat, which permits fluid at main reservoir pressure to flow from chamber 162 to chamber 164 and from thence through passage 134 to chamber 133 at the left hand side of the double check valve 113. Chamber 112 at the right hand side of double check valve 113 is at atmospheric pressure, due to the connection through passage and pipe 114, cavity 115 in slide valve 45, of the electric application valve device 5, and the atmospheric passage 116. Consequently, the fluid under pressure supplied to chamber 133 of the double check valve device, shifts check valve 113 to the right, thereby permitting fluid under pressure to flow from chamber 133 through passage and pipe 111 to the brake cylinder 10 and apply the brakes.

As hereinbefore described, the vent valve device 7 is operated, to vent fluid under pressure from the brake pipe 26 to effect an emergency application of the brakes, by fluid under pressure supplied from emergency chamber 118 in the electric application valve device 5. The fluid under pressure thus supplied to piston chamber 57 of the vent valve device is gradually vented to the atmosphere through port 146 in piston 56, chamber 58 and the atmospheric passage 143, so that the vent valve 59 is held unseated by piston 56 until the fluid pressure in piston chamber 57 becomes reduced to a low degree. Spring 63 then seats the vent valve 59, so that the brake pipe 26 can be recharged to release the brakes, when desired.

In order to release the brakes electrically after an emergency application, the brake switch device 3 is turned to running position, in which position pipe 88, which is supplied with fluid under pressure from the feed valve device 81 through the automatic brake valve device 1 in the manner hereinbefore described, is connected to pipe 91 through cavity 90 in the rotary valve 21. Fluid under pressure from pipe 88 then flows through pipe 91 to the cut-off valve piston chamber 51. The cut-off valve piston 50 and valve 48 are then shifted to the left by spring 54 in the manner hereinbefore described. Unseating of valve 48 permits fluid under pressure to flow from pipe 88 through chamber 49, opening 53 in wall 52, chamber 93, passage 92, vent valve chamber 60 and passage and pipe 119 to the brake pipe 26, thereby recharging the brake pipe.

The recharging of the brake pipe 26 causes the equalizing piston 24 of the distributing valve device 4 to shift the slide valves 27 and 28 to their release position, in which position the pressure chamber 96 is recharged in the manner hereinbefore described and the fluid under pressure is vented from the application piston chamber 160 to the atmosphere by way of passage 165, cavity 104 in the equalizing slide valve 27, pipe and passage 97, cavity 98 in rotary valve 16 of the independent brake valve device 2, pipe and passage 99, cavity 100 in rotary valve 11 of the automatic brake valve device 1 and the atmospheric passage 101. Fluid at brake cylinder pressure in the exhaust valve chamber 164 then shifts the application piston 30 and exhaust valve 163 to the position shown in Fig. 1 of the drawings, in which position fluid under pressure is vented from the brake cylinder 10 through pipe and passage 111, chamber 133 at the left hand side of the double check valve 113, pipe and passage 134, exhaust valve chamber 164 and from thence through the atmospheric passage 105, thereby releasing the brakes.

When the brakes are released electrically after an emergency application of the brakes, the magnet 31 is energized and operates to unseat valve 34, so as to recharge the emergency chamber 118 in the manner hereinbefore described.

If desired, the brakes may be controlled pneumatically by operation of the usual brake valve devices 1 and 2, such as in case of failure of the generator 65. In order to control the brakes pneumatically, the brake valve switch device 3 is placed in running position, as shown in the drawings, in which position the cut-off valve 48 is maintained unseated due to the equalization of pressures on the opposite sides of the cut-off valve piston 50. With the cut-off valve thus held unseated, constant communication is maintained between the brake pipe 26 and the automatic brake valve device 1.

With the electrical energy cut off, both of the magnets 31 and 32 are deenergized. The spring 36 thus seats valve 34 and unseats valve 33 and the emergency chamber 118 is connected to the atmosphere by way of port 146 in the vent valve piston 56. Spring 37 seats the double beat valve 35 in the position shown in the drawings, so that fluid under pressure is supplied to the piston chamber 44 and the piston 43 and slide valve 45 are held in their upper position by the spring 47, in which position chamber 112 at the right hand side of double check valve 113 is maintained at atmospheric pressure due to the connection through passage and pipe 114, cavity 115 in slide valve 45 and the atmospheric passage 116.

In order to effect a service application of the brake pneumatically, the rotary valve 11 of the automatic brake valve device 1 is turned to service position by operation of the handle 13. In service position, passage 82 from the feed valve device 81 is disconnected from passages 88 and 84, thereby cutting off the supply of fluid under pressure from the feed valve device to the brake pipe, and passage 84 from the equalizing piston chamber 85 is connected to the atmospheric passage 101 through a restricted cavity 150, shown in Fig. 2, in the rotary valve 11. The pressure of the fluid in the piston chamber 85 and the equalizing reservoir 87, which is connected to said piston chamber through passage and pipe 86, is thereby permitted to reduce at a slow rate. When the pressure in piston chamber 85 becomes slightly less than the brake pipe pressure in chamber 89 at the opposite side of the equalizing piston, said piston operates to unseat the discharge valve 15 to permit a reduction in brake pipe pressure to be effected in the usual well known manner.

When the brake pipe pressure is thus reduced, the pressure of the fluid in the equalizing piston chamber 25 of the distributing valve device 4 is also reduced, since said chamber communicates with the brake pipe 26 through passage and pipe 119. When the pressure in piston chamber 25 is thus reduced below the pressure in valve chamber 29, the equalizing piston 24 and slide valves 27 and 28 are shifted to the usual service position, in which fluid under pressure is permitted to flow from valve chamber 29 and the connected pressure chamber 96 through the service port 150 in slide valve 27 and passage 165 to the application piston chamber 160 and from said passage through cavity 151 and passage 102 to the application chamber 103. The pressure of fluid thus supplied to the application piston chamber 160, causes the application piston 30 to operate the slide valves 161 and 163 and supply fluid under pressure to the brake cylinder 10 in the same manner as hereinbefore described; the double check valve 113 being shifted to its right hand position by fluid under pressure supplied through passage 134 to chamber 133, in order to establish communication from said passage to the brake cylinder 10. It is possible to thus shift the double check valve, since as hereinbefore described, when the electric current is cut off, the slide valve 45 in the application valve device 5 is maintained in the position shown in Fig. 1 of the drawings, in which position the check valve chamber 112 is connected to the atmosphere.

In order to release the brakes pneumatically after a service application of the brakes is effected, the brake valve handle 13 is operated to turn the rotary valve 11 to running position, in which position fluid under pressure is again supplied from the feed valve device 81 through passage 82, cavity 83 in rotary valve 11 and passage 88 to the brake pipe and from said cavity 83 through passage 84 to the equalizing piston chamber 85 and equalizing reservoir 87. The brake pipe 26 is thus recharged, causing the equalizing piston 24 in the distributing valve device to shift the slide valves 27 and 28 to release position, in which the brakes are released in the manner hereinbefore described.

If it is desired to pneumatically effect an emergency application of the brakes, the brake valve handle 13 is operated to turn the rotary valve 11 to emergency position, in which the supply of fluid under pressure from the feed valve device 81 to the brake pipe 26 is cut off in the same manner as when a service application of the brakes is effected, and pipe 88, which is connected to the brake pipe 26, through the cut-off valve chamber 49, opening 53 in wall 52 and chamber 93 of the cut-off valve device 6, passage and pipe 92, vent valve chamber 60 and passage and pipe 119, is connected to the atmosphere through cavity 152, shown in Fig. 2, in the rotary valve 11 and the atmospheric passage 101. Pipe 92, which is connected directly to the brake pipe; and not through the cut-off valve device 6, is also connected to the atmosphere through cavity 152 in the rotary valve 11 and the atmospheric passage 101.

Since the brake pipe 26 is thus connected to the atmosphere through the brake valve device 1 in emergency position, the fluid under pressure is suddenly vented from said brake pipe to the atmosphere and causes an emergency application of the brakes to be effected in the same manner as hereinbefore described.

The venting of fluid under pressure from the brake pipe to the atmosphere by way of either passage 88 or passage 92 effects an emergency application of the brakes. The two passages are employed however, so that if for any reason, the cut-off valve 48 should close and prevent communication between passage 88 and the brake pipe 26, then the emergency action will be assured by the direct connection between passage 92 and the brake pipe 26. The cut-off valve 48 might accidentally close as in case the pipe 91 should become broken and vent the fluid under pressure from the cut-off valve piston chamber 51, under which condition the pressure of fluid in chamber 93 at the opposite side of the cut-off valve piston 50 would shift said piston to the right, thereby closing the valve 48.

In order to release an emergency application of the brakes, effected by operation of the brake valve device 1, the brake valve handle 13 is operated to turn the rotary valve 11 to running position, in which the equipment is recharged and the brakes released in the same manner as hereinbefore described.

Since the independent brake valve device 2 and distributing valve device 4 are the same as employed in the well known "E T" locomotive brake equipment, it is apparent that, whenever desired, the locomotive brakes may be operated independently of the train brakes in the usual well known manner.

If, when controlling the brakes electrically, the electric current should fail, the deenergization of the magnet 31 permits valve 33 to be unseated to connect the emergency chamber 118 to the vent valve device 7. Fluid under pressure from said chamber then operates the vent valve device 7 to effect an emergency application of the brakes as hereinbefore described. In order to prevent the brakes from being released however, after the fluid under pressure is vented from the emergency chamber and the vent valve 59 closes, the brake switch device 3 is turned to emergency position, in which the cut-off valve piston chamber 51 is vented thereby permitting the cut-off valve 48 to seat to prevent further flow of fluid under pressure to the brake pipe.

After current failure with resultant emergency application of the brakes as just described, if it is desired to control the brakes pneumatically, the brake switch device 3 is turned to running position, in which the cut-off valve device 6 is operated to establish communication between the fluid pressure supply from pipe 88 and the brake pipe 26, thereby permitting the brake pipe to become recharged and the brakes to be released, after which the brakes can be controlled by the operation of the brake valve device 1, in the same manner as hereinbefore described.

It will be noted that the double check valve 113 is interposed in the connection to the brake cylinder 10, so as to cut off the atmospheric connection through either the distributing valve device 4 or the electric application valve device 5 according to which is inoperative in applying the brakes, i. e. when a service application of the brakes is effected electrically and fluid under pressure is supplied to the brake cylinder by way of pipe 114 and check valve chamber 112, the check valve chamber 133 is at atmospheric pressure, due to the distributing valve exhaust slide valve 163 being in the release position, as shown in the drawings.

The ball check valve 106 is provided between pipe 88 and passage 107 in the application valve device 5, so that if for any reason the fluid under pressure should fail or the pipe 88 should break, when the brakes are released, the fluid under pressure can not be vented from the emergency chamber 118 by way of the unseated valve 34. Consequently, if such a failure should occur, the brake switch device 3 can be turned to emergency position and magnet 31 deenergized, which will permit the fluid under pressure from the emergency chamber 118 to flow to the vent valve device 7 and cause an emergency application of the brakes to be effected in the manner hereinbefore described.

As hereinbefore mentioned, this invention is adapted to be employed for controlling electropneumatic brakes on a train, of the type disclosed in the pending application of Thomas H. Thomas and John N. Good, Serial No. 341,603, filed February 21, 1929. Since, in said pending application, the valve devices employed on cars in a train are controlled by the operation of magnets similar to the magnets 31 and 32 employed in this invention, or are controlled by variations in pressure in a brake pipe connected to the brake pipe 26, it is obvious that said valve devices will operate harmoniously with this invention.

From the foregoing description of the operation of my invention, it will be apparent that I have provided an improved locomotive brake equipment having means by which the brakes on the locomotive and connected train may be controlled either electrically, by operation of the brake switch device 3, or pneumatically, by operation of the usual automatic brake valve device, and if desired, the locomotive brakes may, under certain conditions, be pneumatically controlled independently of the train brakes by the usual independent brake valve device 2. One particularly desirable feature is that when an electric service application of the brakes is effected, the pressure of fluid in the reservoir 8 is maintained by flow past the check valve 106 and the pressure of fluid in the brake pipe 26 is maintained substantially at the normal pressure by flow of fluid under pressure through the cut-off valve device 6, but when an electric emergency application of the brakes is effected, the cut-off valve device 6 is operated to cut off the flow of fluid under pressure to the brake pipe, and the vent valve device 7 is operated to suddenly reduce brake pipe pressure for causing a pneumatic, emergency application of the brakes to be effected in the usual well known manner. Another feature of my invention consists in providing means which operates automatically to effect an emergency application of the brakes in case of any failure in the electric control system, such as for instance, the failure of the electric current.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake pipe, of pneumatic means operative to supply fluid under pressure to said brake pipe and to pneumatically control the brakes on a train by varying the pressure of fluid in said brake pipe, means operative at one time and independently of said pneumatic means to control the brakes on the train without varying the pressure of the fluid in said brake pipe and operative at another time to reduce the pressure in said brake pipe to cause said pneumatic means to operate to apply the brakes on the train.

2. The combination with a brake pipe, of pneumatic means operative to supply fluid under pressure to said brake pipe, electrically controlled means operative at one time and independently of said pneumatic means to vent fluid under pressure from said brake pipe to effect an application of the brakes on a train and operative at another time to control the brakes on a train independently of the pressure of fluid in said brake pipe.

3. The combination with a brake pipe, of pneumatic means operative to control the supply of fluid under pressure to said brake pipe, and electro-pneumatic means operative at one time to cut off the supply of fluid under pressure to said brake pipe and vent fluid under pressure from said brake pipe to pneumatically effect an application of the brakes on a train and operative at another time to control the brakes on the train independently of the fluid under pressure in said brake pipe.

4. The combination with a brake pipe, of means operative according to variations in pressure in said brake pipe to control the brakes on a train, and means operative independently of the pressure of fluid in said brake pipe to control the brakes on the train, the second mentioned means being also operative to cause the first mentioned means to effect an application of the brakes on the train.

5. In a brake apparatus, the combination with pneumatic means for applying and releasing the brakes on a locomotive and cars of a train, of electro-responsive means operative at one time independently of said pneumatic means to also apply and release the brakes on the locomotive and cars of the train and operative at another time to cause said pneumatic means to operate and apply the brakes on said locomotive and cars of the train.

6. In a brake apparatus, the combination with means for controlling the brakes electrically and means for controlling the brakes pneumatically, of a brake pipe, and valve means operative in one position of the first mentioned means to supply fluid under pressure to the brake pipe, and operative in another position to cut off the supply of fluid under pressure to said brake pipe, said first mentioned means being adapted to vent fluid under pressure from said brake pipe in the second mentioned position, to effect an application of the brakes.

7. In a brake apparatus, the combination with electro-pneumatic means for controlling the brakes and a brake switch device for controlling the operation of said means, of pneumatic means for independently controlling the brakes, a brake valve device for controlling the operation of said pneumatic means, a brake pipe, a cut-off valve device operative in one position of said brake switch device and brake valve device to control the supply of fluid under pressure to said brake pipe, and a valve device for venting fluid under pressure from said brake pipe, the brake switch device being operative in another position to cause said cut-off valve device to cut off the supply of fluid under pressure to the brake pipe and to cause said valve device to vent fluid under pressure from said brake pipe to apply the brakes, the brake valve device being also operative in another position to vent fluid under pressure from said brake pipe to apply the brakes, irrespective of the operation of said cut-off valve device.

8. In a locomotive brake system, the combination with a brake valve device for controlling the brakes, of a brake pipe, a valve device for controlling the flow of fluid under pressure from a passage in said brake valve device to said brake pipe, said brake valve device being operative in one position to vent fluid under pressure from said brake pipe through said passage to effect an emergency reduction in brake pipe pressure, and a brake switch device operative to cause said valve device to close and cut off the supply of fluid under pressure to said brake pipe, said brake valve device being also operative, when said valve device is closed, to vent fluid under pressure from said brake pipe to effect an emergency reduction in brake pipe pressure.

9. In an electro-pneumatic brake system, the combination with a brake pipe, of a pneumatically controlled valve device operative to vent fluid under pressure from said brake pipe to effect an application of the brakes, a reservoir, means including a check valve for charging said reservoir, and electro-responsive means operative to supply fluid under pressure from said reservoir to said valve device.

10. In a locomotive brake equipment, the combination with a brake pipe, of pneumatic means for supplying fluid under pressure to said brake pipe and for controlling the brakes on a train, electro-pneumatic means for controlling the brakes on a train, said electro-pneumatic means comprising a pair of magnets, a single train wire, and a brake switch device operative to control electric current in said train wire for governing the operation of said magnets, a valve device operative to cut off the supply of fluid under pressure to said brake pipe, valve means for venting fluid under pressure from said brake pipe and an application valve device controlled by the operation of said magnets and operative in one position of said brake switch device to effect a release of the brakes, in another position of said brake switch device to effect a service application of the brakes and operative in a third position of said brake switch device to cause said valve means to operate and vent fluid under pressure from the brake pipe to effect an emergency application of the brakes, said valve device being also operative in the third position of said brake switch device to cut off the supply of fluid under pressure to said brake pipe.

11. In a locomotive brake equipment, the combination with a brake pipe, of a distributing valve device operative in accordance with variations in pressure in said brake pipe to apply and release the brakes on a locomotive, of electro-responsive devices operative at one time independently of said distributing valve device to effect an application of the brakes on the locomotive and operative at another time to cause said distributing valve device to effect an application of the brakes on the locomotive.

12. In an electro-pneumatic brake, the combination with a brake pipe, of a pneumatically operated valve device for controlling the supply of fluid under pressure to said brake pipe, electrically controlled valve means for venting fluid under pressure from said brake pipe to effect an application of the brakes and a brake switch device for simultaneously controlling the operation of said valve device and valve means.

13. In an electro-pneumatic brake, the combination with a brake pipe, of a pneumatically operated valve device for controlling the supply of fluid under pressure to said brake pipe, electrically controlled valve means for venting fluid under pressure from said brake pipe to effect an application of the brakes, and a brake switch device for controlling the operation of said valve means and comprising a valve for controlling the operation of said valve device.

14. In an electro-pneumatic brake, the combination with a brake pipe, of means for controlling the supply of fluid under pressure to said brake pipe, means controlled electrically and operated pneumatically for venting fluid under pressure from said brake pipe, and a brake switch device for simultaneously controlling the operation of both of said means.

15. In a fluid pressure brake, the combination with a brake pipe, of a brake valve device, a cut-off valve device, and a manually operable valve device adapted in emergency position to effect the operation of said cut-off valve device to cut off the supply of fluid under pressure through the brake valve device to the brake pipe, said brake valve device having an emergency position in which fluid under pressure is vented from the brake pipe.

16. In an electro-fluid-pressure brake, the combination with a brake pipe, of electrically controlled means for controlling the brakes, a cut-off valve device for controlling communication through which fluid under pressure is supplied to the brake pipe, a manually operated switch device for controlling said electrically controlled means, and valve means operable with said manually operated switch device for controlling the operation of said cut-off valve device.

17. In a fluid pressure brake, the combination with a brake pipe, of a brake valve device, and a cut-off valve device operative in effecting an emergency application of the brakes for cutting off communication through which fluid under pressure is supplied to the brake pipe through said brake valve device, said brake valve device having an emergency position in which fluid under pressure is vented from the brake pipe for effecting an emergency application of the brakes.

18. In an electro-fluid-pressure brake system, the combination with a brake cylinder, of fluid pressure controlled means for supplying fluid under pressure to the brake cylinder, electro-fluid-pressure controlled means for also supplying fluid under pressure to the brake cylinder, and a double check valve device operative by the flow of fluid under pressure from one of said controlling means to said brake cylinder for cutting off communication from the brake cylinder to the other controlling means.

JOHN N. GOOD.